United States Patent
Schuck et al.

(10) Patent No.: US 11,086,905 B1
(45) Date of Patent: Aug. 10, 2021

(54) METHOD AND SYSTEM FOR PRESENTING STORIES

(71) Applicant: Twitter, Inc., San Francisco, CA (US)

(72) Inventors: Adam Paul Schuck, New York, NY (US); Keith Tsui, New York, NY (US); Stuart O. Anderson, Oakland, CA (US); Daniel Matthew Scanfeld, San Francisco, CA (US)

(73) Assignee: TWITTER, INC., San Francisco, CA (US)

( * ) Notice: Subject to any disclaimer, the term of this patent is extended or adjusted under 35 U.S.C. 154(b) by 0 days.

(21) Appl. No.: 14/024,499

(22) Filed: Sep. 11, 2013

Related U.S. Application Data

(60) Provisional application No. 61/846,505, filed on Jul. 15, 2013.

(51) Int. Cl.
 *G06F 16/00* (2019.01)
 *G06F 16/28* (2019.01)

(52) U.S. Cl.
 CPC .................. *G06F 16/285* (2019.01)

(58) Field of Classification Search
 CPC ........... G06F 17/30247; G06F 17/3053; G06F 17/30817; G06F 17/30864; G06F 17/3097; G06F 17/3089; G06Q 10/06395; G06Q 30/0244; G06Q 30/0256; G06Q 30/0261; Y10S 707/9994
 See application file for complete search history.

(56) References Cited

U.S. PATENT DOCUMENTS

| | | | |
|---|---|---|---|
| 5,857,179 A * | 1/1999 | Vaithyanathan et al. | |
| 5,911,140 A * | 6/1999 | Tukey et al. | |
| 6,236,990 B1 * | 5/2001 | Geller et al. | |
| 7,870,481 B1 * | 1/2011 | Zaud | G06F 17/3089 707/804 |
| 8,543,577 B1 * | 9/2013 | Ben-Artzi | G06F 17/3071 707/738 |
| 8,645,393 B1 * | 2/2014 | Kolak et al. | 707/748 |
| 8,903,910 B2 * | 12/2014 | Kallayil | 709/204 |
| 9,760,629 B1 * | 9/2017 | Bharat | G06F 17/30705 |
| 2002/0062368 A1 * | 5/2002 | Holtzman | G06F 21/31 709/224 |
| 2005/0138552 A1 * | 6/2005 | Venolia | G06Q 10/107 715/273 |
| 2005/0204300 A1 * | 9/2005 | Mindrum | G06Q 10/10 715/764 |

(Continued)

OTHER PUBLICATIONS

Mining Topic-Specific Concepts and Definitions on the Web, Liu et al, Proceedings of the 12th international conference on World Wide Web, pp. 251-260, 2003.*

*Primary Examiner* — Augustine K. Obisesan
(74) *Attorney, Agent, or Firm* — Nixon & Vanderhye, P.C.

(57) ABSTRACT

A method for presenting stories includes creating clusters of documents. Each cluster corresponds to a story. A computer processor generates, for each cluster, a global ranking of social networking messages about the story. The method further includes identifying, for each cluster, a representative social networking message according to the global ranking, selecting, by the computer processor, for a user, a subset of the clusters, and presenting, to the user, the representative social networking message for each cluster in the subset of the clusters.

32 Claims, 8 Drawing Sheets

(56) References Cited

U.S. PATENT DOCUMENTS

| | | | |
|---|---|---|---|
| 2005/0226511 A1* | 10/2005 | Short | 382/225 |
| 2006/0042483 A1* | 3/2006 | Work et al. | 101/91 |
| 2007/0038646 A1* | 2/2007 | Thota | G06F 17/30864 |
| 2008/0046511 A1* | 2/2008 | Skrenta | G06Q 10/107 709/204 |
| 2008/0208847 A1* | 8/2008 | Moerchen | G06F 17/30696 |
| 2008/0304808 A1* | 12/2008 | Newell et al. | 386/52 |
| 2009/0070346 A1* | 3/2009 | Savona et al. | 707/100 |
| 2009/0172783 A1* | 7/2009 | Eberstadt | G06Q 10/107 726/4 |
| 2009/0327320 A1* | 12/2009 | Yan et al. | 707/101 |
| 2010/0198584 A1* | 8/2010 | Habu et al. | 704/9 |
| 2010/0228777 A1* | 9/2010 | Imig | G06F 17/30699 707/772 |
| 2010/0293170 A1* | 11/2010 | Hall et al. | 707/750 |
| 2010/0299603 A1* | 11/2010 | Farkas | 715/733 |
| 2010/0312769 A1* | 12/2010 | Bailey | G06F 16/285 707/740 |
| 2011/0022602 A1* | 1/2011 | Luo et al. | 707/748 |
| 2011/0041075 A1* | 2/2011 | Cierniak | G06Q 30/02 715/745 |
| 2011/0093464 A1* | 4/2011 | Cvet | G06F 17/3071 707/737 |
| 2011/0131282 A1* | 6/2011 | Kraft et al. | 709/206 |
| 2011/0320542 A1* | 12/2011 | Bendel | G06F 17/274 709/206 |
| 2012/0179449 A1* | 7/2012 | Raskino | G06F 17/30719 704/2 |
| 2012/0191715 A1* | 7/2012 | Ruffner | G06F 17/30011 707/738 |
| 2012/0239650 A1* | 9/2012 | Kim et al. | 707/737 |
| 2012/0254188 A1* | 10/2012 | Koperski et al. | 707/740 |
| 2012/0303623 A1* | 11/2012 | Punera | G06F 17/3071 707/738 |
| 2012/0330969 A1* | 12/2012 | Estrada Guadarrama et al. | 707/748 |
| 2013/0117261 A1* | 5/2013 | Sambrani | G06F 17/30867 707/734 |
| 2013/0304822 A1* | 11/2013 | Tetreault | H04N 21/2187 709/204 |
| 2013/0332523 A1* | 12/2013 | Luu | G06Q 30/0251 709/204 |
| 2014/0164365 A1* | 6/2014 | Graham | 707/723 |
| 2014/0172877 A1* | 6/2014 | Rubinstein et al. | 707/748 |
| 2014/0185954 A1* | 7/2014 | Hsiao | H04L 67/1044 382/264 |
| 2014/0207860 A1* | 7/2014 | Wang et al. | 709/204 |

\* cited by examiner

METHOD AND SYSTEM FOR PRESENTING STORIES

CROSS-REFERENCE TO RELATED APPLICATIONS

This application claims benefit under 35 U.S.C. § 119(e) of U.S. Provisional Patent Application No. 61/846,505, filed on Jul. 15, 2013, and entitled "METHOD AND SYSTEM FOR PRESENTING STORIES," which is hereby incorporated by reference.

BACKGROUND

Networks of computing devices provide a mechanism for users of the computing devices to communicate. For example, a user may communicate with other users in a virtual social network.

SUMMARY

In general, in one aspect, embodiments relate to a method for presenting stories. The method includes creating clusters of documents, where each cluster corresponds to a story. The method further includes generating, by a computer processor, for each cluster, a global ranking of social networking messages about the story, identifying, for each cluster, a representative social networking message according to the global ranking, selecting, by the computer processor, for a user, a subset of the clusters, and presenting, to the user, the representative social networking message for each cluster in the subset of clusters.

In general, in one aspect, embodiments relate to a system for presenting stories that includes a computer processor and memory. The memory including a clustering engine, a global ranker, and a personalization engine. The clustering engine is configured to execute on the computer processor to enable the computer processor to create clusters of documents, where each cluster corresponds to a story. The global ranker configured to execute on the computer processor to enable the computer processor to generate, for each cluster, a global ranking of social networking messages about the story, and identify, for each cluster, a representative social networking message according to the global ranking. The personalization engine, executing on the computer processor, is configured to select, for a user, a subset of the clusters, and present, to the user, the representative social networking message for each cluster in the subset of clusters.

In general, in one aspect, embodiments relate to a non-transitory computer readable medium that includes computer readable program code for creating clusters of documents, where each cluster corresponds to a story. The computer readable program code is further for generating, by a computer processor, for each cluster, a global ranking of social networking messages about the story, identifying, for each cluster, a representative social networking message according to the global ranking, selecting, by the computer processor, for a user, a subset of the clusters, and presenting, to the user, the representative social networking message for each cluster in the subset of clusters.

Other aspects of the invention will be apparent from the following description and the appended claims.

DETAILED DESCRIPTION

Figure 1A:
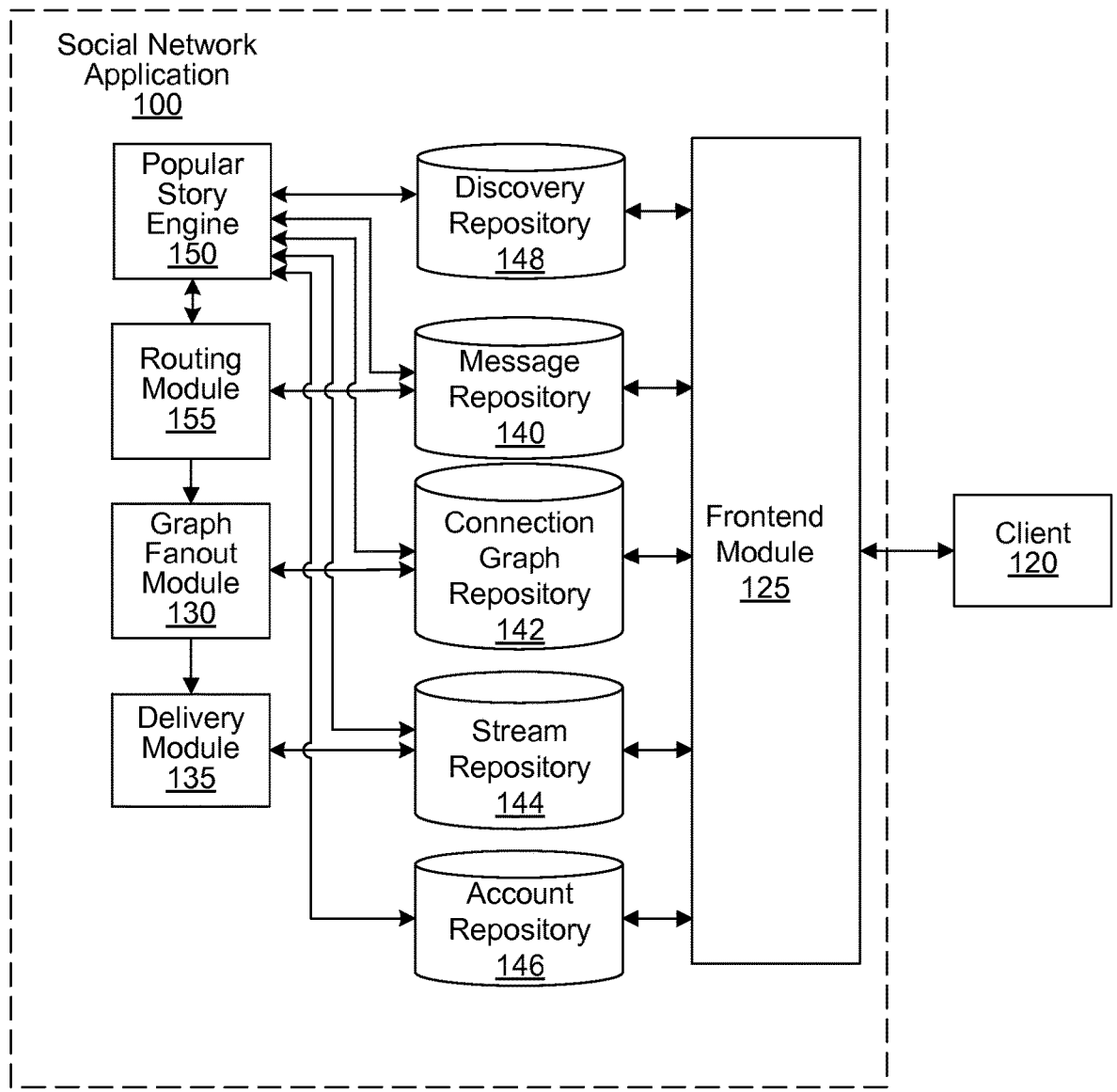
FIGS. 1A-1C show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for presenting stories to a user of a social network. Specifically, one or more embodiments of the invention track when users of a social network application select references to documents about stories. Documents are added to a cluster about a story. A representative social networking message for the story is selected. When a request is received for stories for a user, one or more embodiments select a subset of the stories corresponding to the clusters. The subset of stories is ranked and the corresponding representative social networking messages are presented to a user. In one or more embodiments of the invention, a user is any individual or entity that uses a social network application.

In one or more embodiments of the invention, each story is a topic (e.g., a current event, such as a news item). Documents are works that are published about a story. A document may be an article (e.g., news article or other article), a uniform resource locator (URL) of a web page, a photo, file transfer protocol (ftp) link, file attachment, and or any other type of document or combination thereof. In other words, the story is the topic, and the documents are accountings, opinions, and perspectives of the topic. For example, when a famous actress, Jane Smith, gets married, the story is Jane Smith getting married. Continuing with the example, the documents may include various published works about Jane Smith wedding, such as news articles published on news websites, gossip articles about Jane Smith, opinion articles whose authors speculate as to why Jane Smith married the particular man, published multimedia documents detailing the wedding, fashion articles about the wedding dress, and/or any other documents about the story.

FIG. 1A shows a schematic diagram of a system in accordance with one or more embodiments of the invention. Specifically, FIG. 1A shows a social network application (100) and a client (120) in accordance with one or more embodiments of the invention. The social network application (100) may also be referred to as a messaging platform in accordance with one or more embodiments of the invention.

A social network application (100) connects users to other users (i.e., clients) of the social network application (100), exchanges social networking messages between connected users of the social network application (100), and provides an interface for a user to create and view social network messages. In one or more embodiments of the invention, social network messages are broadcast social networking messages that are transmitted to at least a set of users. The users in the set may be self-selected (e.g., followers of the transmitting user) or users that satisfy a certain status with the transmitting user (e.g., belong to a group, friend, family, etc.). The social networking messages may include, for example, a comment from a user on a document, personal status update, a reference to a document, and other information.

Further, in one or more embodiments of the invention, the social networking application (100) includes functionality to receive an original reference from a user for a document, generate a social network reference from the original reference, and transmit the social network reference to other users. Thus, a user may share the document via the social network application (100) by sending a message containing a reference to the document to other users or posting a social network reference to the document. In one or more embodiments of the invention, the original reference is a reference to the location of the published document, such as a uniform resource locator (URL) of a web page. The social network reference is an indirect reference to the location of the published document. Specifically, the social network reference is mapped to the original reference in the discovery repository (148). The social network application may be configured to perform analytics on the engagement of the social network reference and/or shorten the original reference. For example, the social network reference and the original reference may be a hypertext transfer protocol link or another mechanism for referencing the location of a document.

As shown in FIG. 1A, the social network application (100) has multiple components including a popular story engine (150), a machine learning module (not shown), a discovery repository (148), a frontend module (125), a routing module (155), a graph fanout module (130), a delivery module (135), a message repository (140), a connection graph repository (142), a stream repository (144), and an account repository (146). Various components of the social network application (100) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, the social network application (100) is a platform for facilitating real-time communication between one or more entities. For example, the social network application (100) may store millions of accounts of individuals, businesses, and/or other entities (e.g., pseudonym accounts, novelty accounts, etc.). One or more users of each account may use the social network application (100) to send social networking messages to other accounts inside and/or outside of the social network application (100). The social network application (100) may be configured to enable users to communicate in "real-time", i.e., to converse with other users with a minimal delay and to conduct a conversation with one or more other users during simultaneous sessions. In other words, the social network application (100) may allow a user to broadcast social networking messages and may display the social networking messages to one or more other users within a reasonable time frame so as to facilitate a live conversation between the users. Recipients of a social networking message may have a predefined graph relationship with an account of the user broadcasting the social networking message. In one or more embodiments of the invention, the user is not an account holder or is not logged in to an account of the social network application (100). In this case, the social network application (100) may be configured to allow the user to broadcast social networking messages and/or to utilize other functionality of the social network application (100) by associating the user with a temporary account or identifier.

Figure 1B:
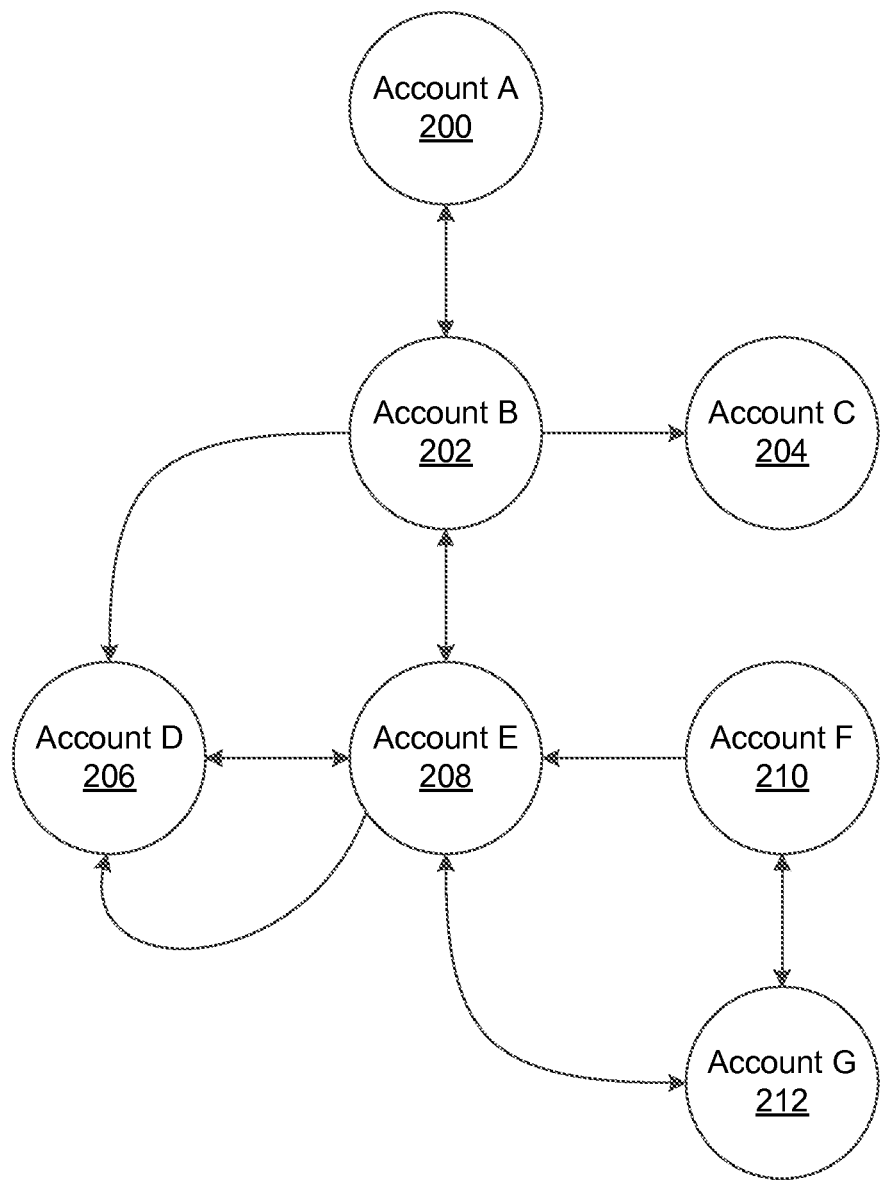

In one or more embodiments of the invention, the connection graph repository (142) is configured to store one or more connection graphs. FIG. 1B shows an example depiction of a connection graph (299) in accordance with one or more embodiments of the invention. As shown in FIG. 1B, the connection graph (299) has multiple components including nodes representing accounts of the social network application (100) (i.e., Account A (200), Account B (202), Account C (204), Account D (206), Account E (208), Account F (210), Account G (212)) and edges connecting the various nodes.

The connection graph (299) is a data structure representing relationships (i.e., connections) between one or more accounts. The connection graph (299) represents accounts as nodes and relationships as edges connecting one or more nodes. A relationship may refer to any association between the accounts (e.g., following, friending, subscribing, tracking, liking, tagging, and/or etc.). The edges of the connection graph (299) may be directed and/or undirected based on the type of relationship (e.g., bidirectional, unidirectional), in accordance with various embodiments of the invention.

Returning to FIG. 1A, in one or more embodiments of the invention, the routing module (155) includes functionality to receive one or more social networking messages and to store the social networking messages in the message repository (140). The routing module (155) may include functionality to assign an identifier to the social networking message and to notify the graph fanout module (130) of a sender of the social networking message.

In one or more embodiments of the invention, the graph fanout module (130) includes functionality to retrieve graph data from the connection graph repository (142) and to use the graph data to determine which accounts in the social network application (100) should receive the social networking message. The graph data, for example, may reflect which accounts in the social network application are "following" a particular account and are, therefore, subscribed to receive status social networking messages from the particular account.

In one or more embodiments of the invention, the delivery module (135) includes functionality to receive a list of accounts from the graph fanout module (130) and the message identifier generated by the routing module (155) and to insert the message identifier into stream data associated with each identified account. The delivery module (135) may then store the message list in the stream repository (144). The stream data stored in the stream repository (144) may make up one or more streams associated with one or more accounts of the social network application (100). A stream may be a dynamic list of social networking messages associated with one or more accounts or may reflect any arbitrary organization of social networking messages that is advantageous for the user of an account.

In one or more embodiments of the invention, the frontend module (125) is a software application or a set of related software applications configured to communicate with external entities (e.g., client (120)). The frontend module (125) may include the application programming interface (API) and/or any number of other components used for communicating with entities outside of the social network application (100). The API may include any number of specifications for making requests from and/or providing data to the social network application (100). For example, a function provided by the API may provide artist/song recommendations to a requesting client (105).

In one or more embodiments of the invention, the frontend module (125) is configured to use one or more of the data repositories (message repository (140), connection graph repository (142), stream repository (144), discovery repository (148), and/or account repository (145)) to define streams for serving social networking messages (i.e., stream data) to a user of the account on the social network application (100). A user may use any client (120) to receive the social networking messages. For example, where the user uses a web-based client to access the social network application (100), an API of the frontend module (125) may be utilized to define one or more streams and/or to serve the stream data to the client for presentation to the user. Similarly, different forms of message delivery may be handled by different modules in the frontend module (125). In one or more embodiments of the invention, the user may specify particular receipt preferences, which are implemented by the frontend module (125).

In one or more embodiments of the invention, one or more of the data repositories (message repository (140), connection graph repository (142), stream repository (144), account repository (146), discovery repository (148)) is a database and/or storage service residing on one or more servers. For example, one or more of the data repositories may be implemented as a storage service using service-oriented architecture (SOA) and configured to receive requests for data and to provide requested data to other components of the social network application (100). In another example, the message repository (140) may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

In one or more embodiments of the invention, one or more of the data repositories (message repository (140), connection graph repository (142), stream repository (144), account repository (146), discovery repository (148)) is a separate application or set of applications residing on one or more servers external (and communicatively coupled) to the social network application (100). Alternatively, in one or more embodiments of the invention, one or more of the data repositories may be an integrated component of the social network application (100) and/or may reside, either partially or entirely, on one or more common hardware devices (e.g., a server).

In one or more embodiments of the invention, the discovery repository (148) may store document metadata about documents. The document metadata may include a list of keywords, tracking information, date of the document, a mapping between social media references and original references to documents, and other information.

In one or more embodiments of the invention, the message repository (140) includes functionality to store social networking messages and social networking messages metadata. The social networking messages metadata may include an identifier of the originating user of the social networking message, a list of users that received the social networking message, a number of users that received the social networking message, statistics (e.g., a ratio of connected users to the originating user that forward the social networking message versus disconnected users to the originating user that forward the social networking message), time and date in which the social networking message is transmitted, and other information.

In one or more embodiments of the invention, the connection graph repository (142) may store information about users. Specifically, the connection graph repository may relate user identifiers of a user to user's preferences and history in the social network application (100). For example, the user preferences and history may include language, connections of the user, topics in which the user is interested and other information.

Figure 1C:
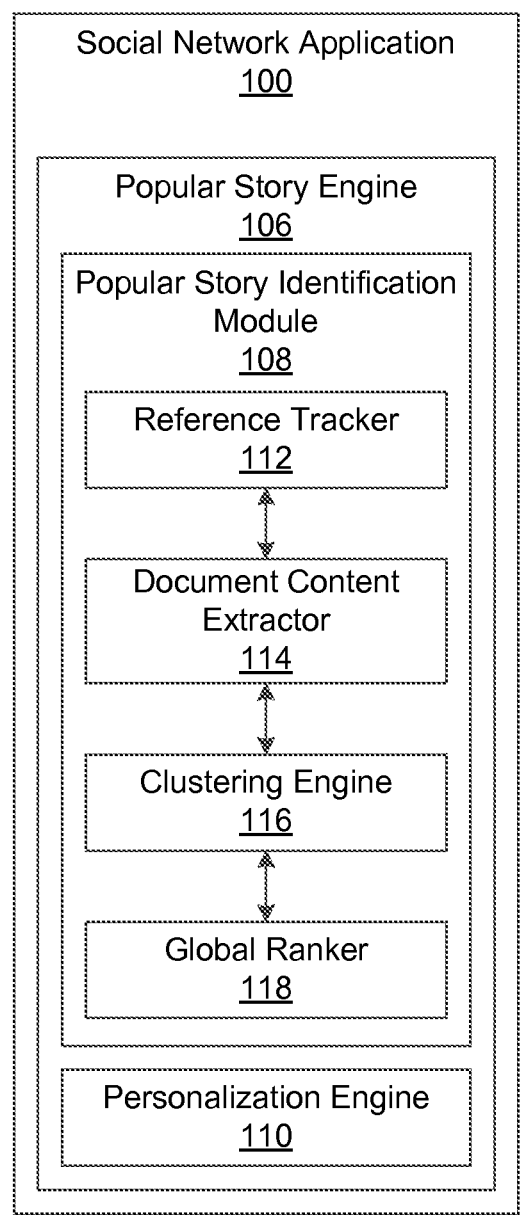

FIG. 1C shows a schematic diagram of a system in accordance with one or more embodiments of the invention. Specifically, FIG. 1C shows a more detailed diagram of the popular story engine (106) in the social network application (100). In other words, the popular story engine (106) in FIG. 1C is essentially the same as the popular story engine (150) in FIG. 1A.

Continuing with FIG. 1C, a popular story engine (106) is a component that includes functionality to recommend stories and representative social networking messages about the story to users. The representative social networking messages may or may not be from users that are connected to the user receiving the recommendation. In one or more embodiments of the invention, the popular story engine includes a popular story identification module (108) and a personalization engine (110).

The popular story identification module (108) is a software component that includes functionality to identify popular stories based on social networking messages and selections of references to documents. The popular story identification module (108) includes a reference tracker (112), a document content extractor (114), a clustering engine (116), and a global ranker (118). Each of these components is discussed below.

The reference tracker (112) includes functionality to track the selection of social network references to documents. Specifically, in one or more embodiments of the invention, the reference tracker includes functionality to obtain tracking information for each time a user selects a social network reference. The tracking information may include an identifier of the document, the number of times the reference is selected, an identifier of the user selecting the reference, an identifier of the user sharing the reference. In other words, the reference tracker (112) includes functionality to track the number of times that a particular document is selected for presentation to a user.

The reference tracker (112) is connected to the document content extractor (114) in accordance with one or more embodiments of the invention. Specifically, the reference tracker (112) may include functionality to queue documents for content extraction with the document content extractor (114). The queuing of documents may be performed immediately upon selection, after certain one or more criteria is satisfied, periodically, or at another time. In one or more embodiments of the invention, the document content extractor (114) is a software component that includes functionality to extract content from a document referenced by a reference. Specifically, the document content extractor (114) includes functionality to obtain a set of keywords in the document to identify the story referenced in the document. In one or more embodiments of the invention, the keywords in the document are descriptive and uncommon terms in the document. By way of an example, the document content extractor (114) may use term frequency-inverse document frequency (tf-idf) to extract the keywords.

In one or more embodiments of the invention, the document content extractor (114) is connected to a clustering engine (116). The clustering engine (116) includes functionality to generate clusters of documents. Each cluster is a collection of documents about a story. Documents in a cluster are linked based on how related the documents are to each other. By way of an example, consider the example in which the story is about Jane Smith getting married. The documents that provide details about the wedding may be directly connected to each other in the cluster, while an horticulturist document that merely references plants used for Jane Smith's wedding and a fashion article about what Jane Smith was wearing when she was married may not be connected to each other. In one or more embodiments of the invention, whether two documents are connected in the cluster may be based on the number of keywords that are present in both of the two documents. In one or more embodiments of the invention, the clustering engine (116) includes functionality to implement k-means clustering algorithm to add documents to the cluster.

The clustering engine is connected to a global ranker (118) in accordance with one or more embodiments of the invention. In one or more embodiments of the invention, the global ranker (118) includes functionality to identify, for each story, a representative social networking message for the story. In other words, the global ranker (118) includes functionality to create a ranking of social networking messages across users of the social network application and select the social networking message that represents a story.

Continuing with the popular story engine (106), the personalization engine (110) includes functionality to obtain and present recommended representative social networking messages about stories to a user. Specifically, the personalization engine (110) includes functionality to identify stories that may be of interest to a particular user and order the representative social networking messages for the identified stories for the particular user.

While FIGS. 1A-1C shows a configuration of components, other configurations may be used without departing from the scope of the invention. For example, various components may be combined to create a single component. As another example, the functionality performed by a single component may be performed by two or more components. For example, the social network application may be a distributed application. A portion of the distributed application may be located on one or more users' computing devices while another portion may be located on different servers. Further, by way of another example, the popular story engine may be a separate application from the social network application.

FIGS. 2A, 2B and 3-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2A:
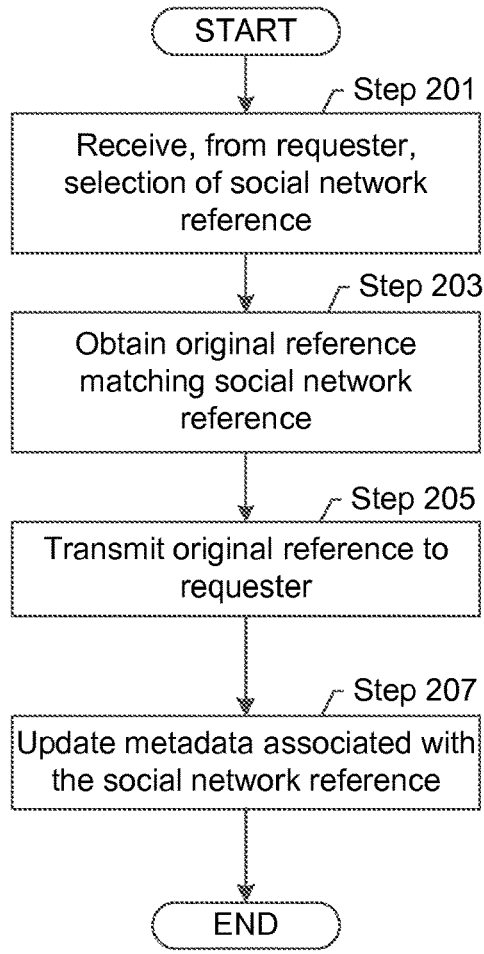
FIGS. 2A, 2B, and 3-6 show flowcharts in accordance with one or more embodiments of the invention.

FIG. 2A shows a flowchart for tracking when users select a document using social media references in accordance with one or more embodiments of the invention. In Step 201, a selection of a social network reference is received from a requester in accordance with one or more embodiments of the invention. For example, the requester may select the social network reference from a social networking message, from a webpage, or from another source. In one or more embodiments of the invention, the reference references a server of the social networking application and includes an identifier of the document.

In Step 203, an original reference matching the social network reference is obtained in accordance with one or more embodiments of the invention. In one or more embodiments, the server may use the identifier of the document in the social network reference to obtain the original reference to the document.

In Step 205, the original reference is transmitted to the requester in accordance with one or more embodiments of the invention. For example, the social network application may send the original reference to the computing device of the requester. The original reference may be transmitted as a redirection, such that the requester may be unaware of the redirection. Once the requester receives the original reference, the requester may view the document. In one or more embodiments of the invention, because of the redirection, the social network application may track the selection of references to documents.

Although FIG. 2A presents obtaining a social network reference from an original reference, in some embodiments, the original reference is included in one or more social networking messages. In such embodiments, the social network reference may not be used. When the original reference is shared in a social network message, analytics about selection of the document may be obtained by the social network application at the time of or prior to opening a browser to present the document in one or more embodiments. Additionally or alternatively, analytics about a document may be obtained and the trigger to extract the content from a document may be performed based on the inclusion of the document in the social networking message rather than when the document is selected by a receiving user to be read.

Figure 4:
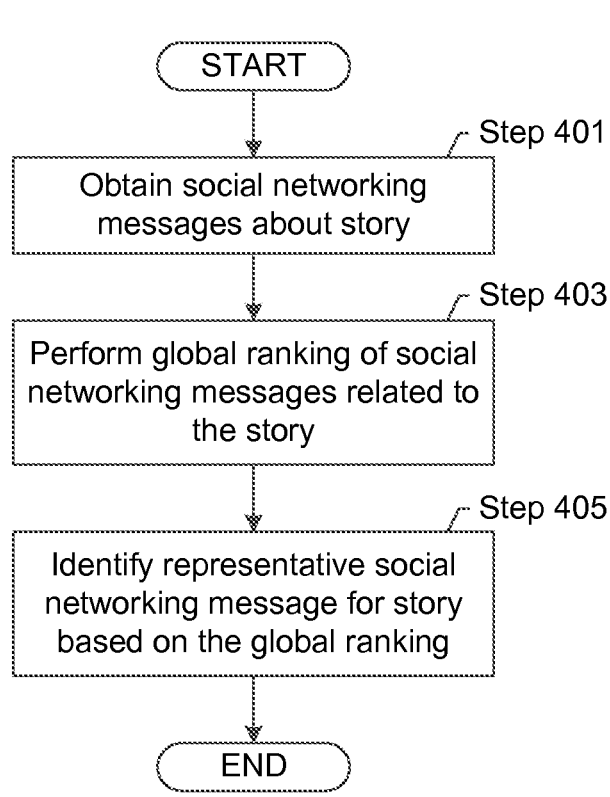
Figure 5:
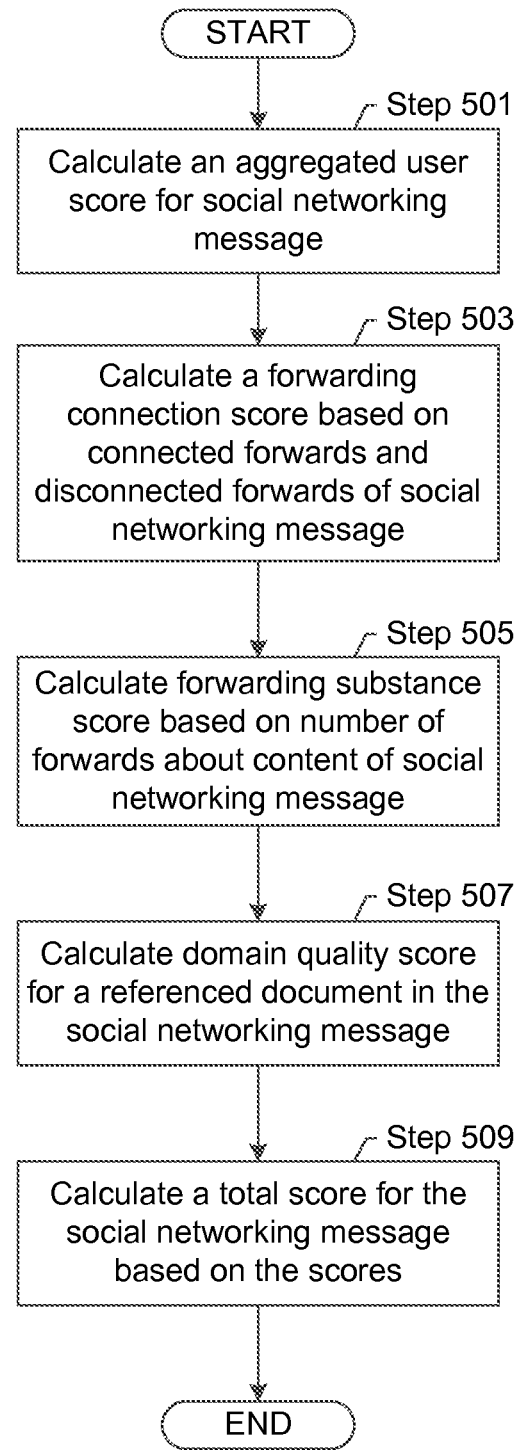
Figure 6:
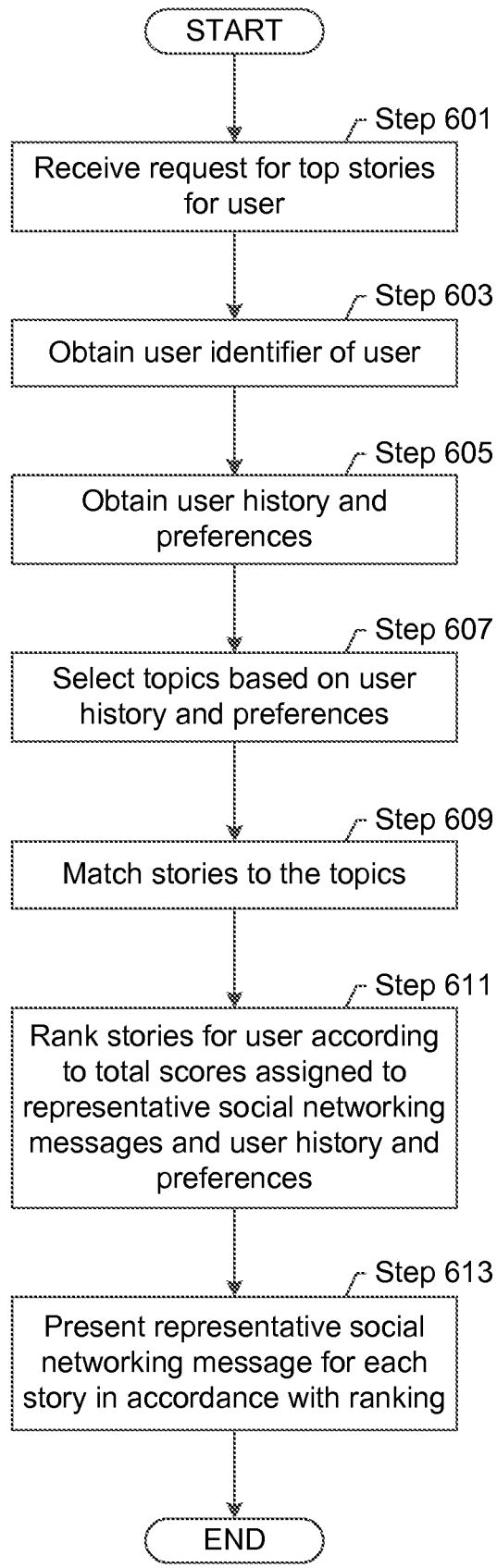

Continuing with FIG. 2A, in Step 207, metadata associated with the social network reference is updated based on the selection. For example, an engagement event can be recorded and stored in a data repository (e.g., discovery repository (148) of FIG. 1A, discussed above). In this way, multiple engagement events of selecting the reference may be stored and used to determine the popularity of references and/or messages including references in order to identify representative content/recommendations (as shown in the examples of FIGS. 4-6).

Figure 2B:
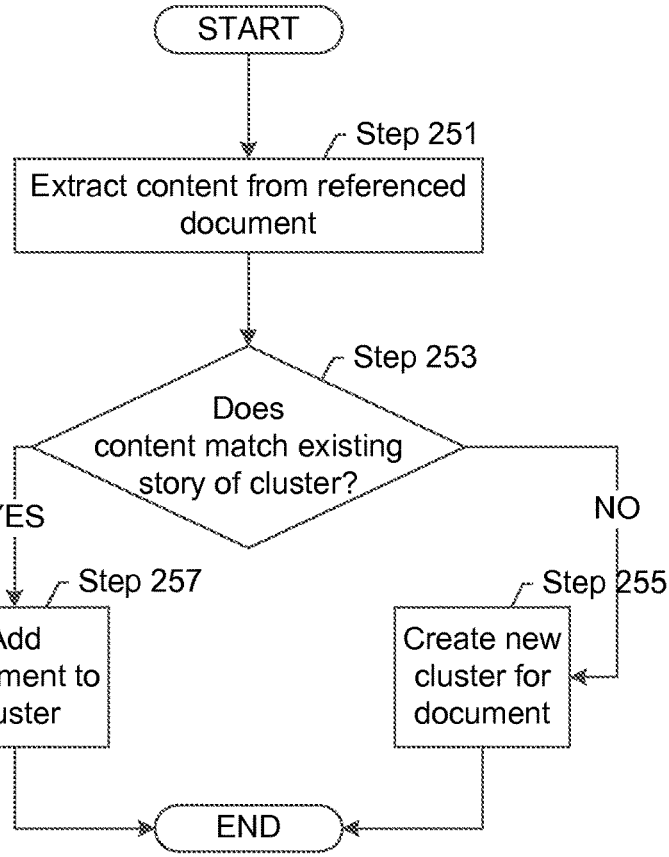

FIG. 2B shows a flowchart for adding documents to a cluster in accordance with one or more embodiments of the invention. Specifically, in one or more embodiments, as part of FIG. 2B or prior to FIG. 2B, a determination may be made whether the reference is a new reference. In such a scenario, the document may be deemed a new document that is not yet added to the clusters. Other criteria for adding the document to the cluster may be used, such as number of social networking messages that include a reference to the document, the users that select a reference to the document, a popularity rating of the reference exceeds a predefined amount, or other criteria. Making a determination that one or more of the criteria are satisfied may be performed by using the metadata stored in Step 207 of FIG. 2A. Further, in one or more embodiments of the invention, the social network application may be configured to detect new references and to queue them for content extraction upon detecting the broadcasting message, periodically according to a batch process, and/or after one or more criteria is satisfied.

In Step 251 of FIG. 2B, content from a referenced document is extracted in accordance with one or more embodiments of the invention. In one or more embodiments of the invention, the social network application scans the document to determine the story in the document. The social network application may scan the entire document, only the title, or only another portion of the document. Extracting content is discussed in more detail below with reference to FIG. 3.

Continuing with FIG. 2B, in Step 253, a determination is made whether the content of the document matches an existing story of a cluster in accordance with one or more embodiments of the invention. Specifically, a determination is made whether the document is about a story of an existing cluster. Determining whether the document is about a story of the cluster may be performed by comparing the content of the document with the content of documents in existing clusters. If the new document does not have matching or similar content to the existing documents, then the new document may be deemed to not match an existing story. In such a scenario, a new cluster is created for the document in Step 255 in accordance with one or more embodiments of the invention. Creating a new cluster may include storing metadata for the story corresponding to the cluster, such as story information and other descriptive words about the story.

If the content of the document matches an existing story, then the document is added to the cluster in Step 257. Adding the document to the cluster is discussed in more detail below with reference to FIG. 3.

In one or more embodiments of the invention, although not shown in FIG. 2B, clusters may decay over time, such as when documents in the cluster are no longer selected, new documents are not added to the cluster, or other factor, or combination of factors. The amount of decay may adjust a score for the cluster. If the score is below a threshold, the cluster may be evicted and no longer considered. The eviction may be further based on a predetermined maximum number of clusters being exceeded by a new cluster being added to the system.

Figure 3:
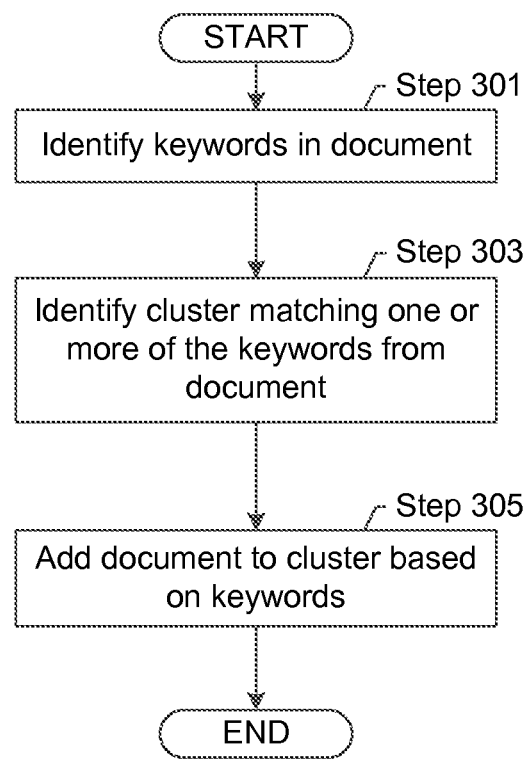

FIG. 3 shows a flowchart for adding a document to a cluster in accordance with one or more embodiments of the invention. In Step 301, keywords in the document are identified. Identifying keywords may be performed using a TF-IDF algorithm that associates a TF-IDF value with each word in the document. Briefly, TF-IDF is a numerical statistic which reflects how important a word is to a document over all documents. The TF-IDF value increases proportionally to the number of times a word appears in the document, but is offset by the frequency of the word in the documents in the document repository. In other words, the offset is based on the commonality of the word. When the TF-IDF value is greater than a threshold, then the word is added as a keyword for the document. TF-IDF is only an example of an algorithm to extract content. Various TF-IDF algorithms or other algorithms may be used to extract content without departing from the scope of the invention.

In Step 303, a cluster matching the one or more of the keywords in the document is identified. In one or more embodiments of the invention, metadata for the cluster is accessed to obtain keywords for the cluster. If a predefined number or percentage of the keywords for the cluster matches the keywords in the document, then the cluster may be deemed to match the document.

In Step 305, the document is added to the cluster based on the keywords in the document. Adding the document to the cluster may be performed, for example, using a heuristic clustering algorithm based on k-means. Other clustering algorithms may be used without departing from the scope of the invention.

FIG. 4 shows a flowchart for selecting a representative social networking message for a story in accordance with one or more embodiments of the invention. In Step 401, social networking messages about a story are obtained in accordance with one or more embodiments of the invention. The social networking messages may be obtained separately or as part of receiving the selection of social network references (discussed above and in FIG. 2A). In other words, when a user comments on a story, the user may identify the story, such as by using keywords which match keywords in one or more documents about the story, in accordance with one or more embodiments of the invention. By matching the keywords provided by the user with the keywords in a cluster of documents, the popular story engine may relate the social networking message with the cluster, and, thus, the story. By way of another example, when a user comments on a story, the user may provide an original reference or social network reference to a document. In the example, the popular story engine may access the document and extract keywords from the document to associate the document with a particular cluster and, thus, a story in accordance with one or more embodiments of the invention. In the above example, the obtaining of the social networking messages may be performed at virtually any time. For example, a social networking message may be obtained when an originating user of the social networking message transmits the social networking message, when the social networking message is presented to a receiving user, when a receiving user forwards the social networking message, in batch at a preset interval, or at another time or combination thereof.

In one or more embodiments of the invention, as transmitting users (e.g., originating users of the social networking message, receiving users that forward the social networking message) transmit the social networking message and/or receiving users receive the social networking message, tracking information is obtained and stored with the social networking message. For example, the tracking information that may be obtained may include whether the social networking message is forwarded by a disconnected user of the originating user. By way of another example, the tracking information may include a class of transmitting user and/or a statistic based on the class of the transmitting user. The class may be based, for example, on whether the transmitting user is known to transmit spam, whether the transmitting user is known to generally transmit social networking message that are forwarded, the number of connections to other users of the transmitting user, the classes of the other users that are connected to the transmitting user, and other such information. By way of another example, the tracking information may include a ranking provided by a receiving user for the social networking message. For example, the receiving user may select a score to assign to the social networking message.

Continuing with FIG. 4, in Step 403, a global ranking of the social networking messages related to a story is obtained. In one or more embodiments of the invention, the global ranking defines an ordering based on popularity for the social networking messages for a particular story. In physical or virtual storage, however, the social networking messages may or may not be ordered according to the global ranking. Obtaining the global ranking may be performed by calculating and relating a score to each social networking message based on the tracking information. FIG. 5 shows a flowchart for relating a score to a social networking message. Other techniques for scoring a social networking message may be used without departing from the scope of the invention.

In Step 405, a representative social networking message for the story is obtained based on the global ranking in accordance with one or more embodiments of the invention. Obtaining the representative social networking message may be performed by selecting the social networking message with the greatest score (e.g., highest score when having a high score is optimal or lowest score when having a low score is optimal).

Although not shown in FIG. 4, the scores may be reduced based on time, such as the time that elapsed since the last forwarding of the social networking message, the time that elapsed since the original transmission of the social networking message, or other time based metric. By adjusting the score based on time, old social networking messages that are no longer representative may be reduced in the global ranking.

FIG. 5 shows a flowchart for generating a global ranking of social networking messages in accordance with one or more embodiments of the invention. FIG. 5 shows only one example for how a global ranking may be generated. All, none, or only a portion of FIG. 5 may be performed to generate the global ranking without departing from the scope of the invention.

In Step 501, an aggregated user score is calculated for the social networking message in accordance with one or more embodiments of the invention. In one or more embodiments of the invention, calculating an aggregated user score may be performed by calculating an average of scores assigned by receiving users of the social networking message. The average may be an absolute average or a weighted average. For example, calculating the weighted average may be performed by multiplying a weight assigned to the receiving user's class by the score assigned by the receiving user. The average may be calculated, for example, each time a new score is received by a receiving user.

In Step 503, a forwarding connection score is calculated based on connected forwards and disconnected forwards of the social networking message. Specifically, in one or more embodiments of the invention, when a receiving user receives a social networking message, the receiving user may forward the social networking message. Thus, the social networking message may be received by a receiving user from the originating user or from another receiving user that had forwarded the social networking message. Further, in one or more embodiments of the invention, a receiving user may be more likely to forward the social networking message when the receiving user is connected to the originating user (i.e., direct connection exists between receiving user and originating user) than when the receiving user is disconnected from the originating user (i.e., no direct connection exists between receiving user and originating user). In such embodiments, therefore, a disconnected user forwarding a social networking message may indicate a greater quality of the content of the social networking message than social networking messages that are not forwarded by disconnected users.

Calculating the forwarding connection score may be performed by calculating a ratio of the number of forwards by disconnected users to the number of forwards by connected users. By way of another example, calculating the forwarding connection score may be based on a mathematical function of the number of connections between the originating user and the receiving user that forwards the social networking message.

By way of an example of one or more embodiments, consider the scenario in which a popular actor is connected to five million users. The popular actor transmits a social networking message about a story that is received by the five million users. Five thousand of the five million users may forward the social networking message to five hundred disconnected users. Five of the disconnected users may forward the social networking message. In the example, the ratio and, subsequently, the score may be five thousand to five, which is reduced to one thousand to one. Continuing with the example of the one or more embodiments, consider the scenario in which a news anchor is connected to one hundred users. The news anchor transmits a social networking message about the story to the one hundred users. Ten of those one hundred users forward the social networking message to disconnected users. Nine of the disconnected users forward the social networking message. In the example, the ratio for the social networking message for the news anchor is ten to nine. Thus, the social networking message from the news anchor has a better score than the social networking message from the popular actor in the example of the one or more embodiments. The above is only an example and not intended to limit the scope of the invention.

Continuing with FIG. 5, in Step 505, a forwarding substance score is calculated based on a number of forwards about the content of the social networking message in accordance with one or more embodiments of the invention. In one or more embodiments of the invention, when a receiving user forwards a social networking message, the receiving user may add a comment about the social networking message. By extracting keywords from the comment and assigning a value to the keywords based on whether the keywords are positive or negative and/or about the content of the social networking message or the originator of the social networking message, an individual forwarding substance score may be assigned to the social networking message for a particular receiving user that forwards the social networking message. The individual forwarding substance scores from multiple receiving users may be statistically combined (e.g., by calculating an absolute average, weighted average, mode, median, etc.) to obtain a forwarding substance score for the social networking message in accordance with one or more embodiments of the invention.

In Step 507, a domain quality score may be calculated for a referenced document in the social networking message in accordance with one or more embodiments of the invention. As discussed above, a social networking message may have a reference to a document in accordance with one or more embodiments of the invention. If the social networking message has a reference to a document, the quality of the domain in which the document is published may be related to the social networking message as a domain quality score. For example, reputable news websites may have a greater domain quality score than gossip websites and blogs. In one or more embodiments of the invention, obtaining a domain quality score may be performed by extracting the domain from the original reference to the document, and querying a data repository that relates domain quality scores to domains to obtain the domain quality score for the domain. If the domain is not listed in the data repository, then a default domain quality score may be assigned to the social networking message. The domain qualities may be populated automatically in the data repository based on user ratings of the domains, class of users that reference the domains, or other information.

In Step 509, a total score is calculated for the social networking message based on the various calculated scores in accordance with one or more embodiments of the invention. In one or more embodiments of the invention, the total score may be calculated as an average of one or more of the above calculated scores. The average may be an absolute average or a weighted average whereby the weights are pre-assigned to types of scores. Other mathematical functions may be used to calculate a total score without departing from the scope of the invention.

In one or more embodiments of the invention, the total score is assigned to the social networking message. By repeating the process of FIG. 5 for each social networking message to obtain a total score for each social networking message, a global ranking of the social networking messages for the story may be obtained. Using the global ranking, stories may be presented to a user by way of representative social networking messages.

FIG. 6 shows a flowchart for presenting stories to a user in accordance with one or more embodiments of the invention. In Step 601, a request for top stories is received for a user in accordance with one or more embodiments of the invention. The request may be received from the user or on behalf of the user. For example, when a user accesses the social media application, the social media application may automatically request top stories for the user. Alternatively or additionally, the user may select a reference to request top stories.

In Step 603, a user identifier of the user is obtained in accordance with one or more embodiments of the invention. The obtained user identifier may be a login identifier or other identifier that uniquely identifies the user.

In Step 605, user history and preferences are obtained in accordance with one or more embodiments of the invention. Specifically, the user data repository may be queried with the user identifier in order to obtain the user history and preferences from the user data repository.

In Step 607, topics are selected based on the user history and preferences in accordance with one or more embodiments of the invention. The topics may be listed in the user history and preferences or may be interpreted from the user history and preferences. In one or more embodiments of the invention, the topics identify the specific interests of the user. For example, one user may have associated topics of current national and world news, parenting, and computer technology while another user has topics of snowboarding, mountaineering, and cooking. Topic identifiers of the topics may be stored as part of the user history and preferences as part of a listing. In one or more embodiments of the invention, there exists a mapping between the user and topics of interest for the user. This mapping may be generated from any source.

Interpreting the topic identifiers may be performed based on several factors. By way of some examples, the factors may include the connections of the user, keywords in the user's social networking messages, references that the user has selected and/or other information or combination thereof. In the example of connections, a user may be connected to one or more business entity users (e.g., a particular real estate company, a particular rug dealer), media outlet users (e.g., a particular political blog, a particular children's television network), popular individual users (e.g., a popular musician, a member of the United States Senate), or other users that have a known association with a topic. The topic associated with the user's connections may be assigned to the user. The more connections that the user has to users associated with a particular topic, the greater the rank the topic may have amongst the set of topics. For example, consider the scenario in which a user is connected to a member of the United States House of Representatives, follows a national political blog, and regularly selects social network references to political news documents. In such an example, the topic related to the user may be national politics. Continuing with the example, if the user also is connected to several popular surfing stars, a topic of surfing may also be related to the user, but with less rank than the national politics topic. All or a subset of topics may be selected from the set of topics assigned to a user in accordance with one or more embodiments of the invention.

In Step 609, the selected topics are matched to stories in clusters in accordance with one or more embodiments of the invention. In one or more embodiments of the invention, for each story, a determination is made whether the story matches the topic. In one or more embodiments of the invention, the match may be based on whether the keywords in the documents about the story are words that are classified as belonging to the topic. The classification of keywords may be pre-stored in a data repository. For example, a story that has food terms as keywords may be assigned to a food topic. If the user's topic is also food topic, then the story is identified as a matching story in accordance with one or more embodiments of the invention.

In Step 611, the stories for the user are ranked according to the total scores assigned to the social networking messages and the user history and preferences in accordance with one or more embodiments of the invention. In one or more embodiments of the invention, the ranking may be based on several factors. For example, a language filter may be applied to remove stories that are not in the language of the user as defined by the user history and preferences. By way of another example, the ranking assigned to a topic for the particular user may be combined with the total score for a representative social networking message of a story matching the topic to obtain a combined score for the representative social networking message. The stories may be ranked based on the combined scores for the representative social networking message. Based on the combined score, the stories, and, subsequently, the representative social networking messages, may be ranked.

In Step 613, the representative social networking messages are presented for each story in accordance with the ranking in accordance with one or more embodiments of the invention. In one or more embodiments of the invention, presenting the representative social networking message may be performed by displaying the representative social networking message, playing the representative social networking messages, and/or presenting a link to the representative social networking messages.

The following is an example of one or more embodiments of the invention. Other embodiments of the invention may exist. For the following example, consider the scenario in which a popular star of a cooking show is in a trial for defamation. Various documents are written about the popular star, the cooking show, the trial, and the act of defamation. The documents include a blog criticizing the style of cooking of the popular star, an article detailing the defamation, an article that presents a summary of the trial, a document describing the television network's reaction to the trial, a press release by the television network, a document about how popular stars are regularly defamed in the country and only briefly mentions the popular star.

In the example, users of the social network application send social networking messages to each other that include social network references to the above documents as well as additional commentary. Based on the selection of the references and keywords extracted from the documents, the clustering engine identifies the above documents as belonging to a cluster about a story. Some documents are closely related in the cluster (e.g., the article detailing the defamation, the article that presents a summary of the trial, the document describing the television network's reaction to the trial), other documents are only weakly connected to the cluster (e.g., the blog criticizing the style of cooking of the popular star, the document about the popular stars being regularly defamed in the country), and other documents are partially connected to the cluster (e.g., the press release). Where documents are closely connected in the cluster, a story may be identified. Thus, if there are multiple documents about the defamation and the trial as well as multiple documents about the press release, two different stories may be identified for the cluster.

In the example, in addition to identifying clusters, tracking information about social networking messages that reference the documents is obtained and used to identify a representative social networking message for each story in the cluster. In other words, the representative social networking message may be selected based on being forwarded often, being recent, and including a reference to domains having a high domain quality score in the example. Thus, whereas a popular star may send, in response to the defamation trial, a social networking message "Paparazzi=bad" to several connected users who forward the social networking message to disconnected users, who do not forward the social networking message, a user that sends a social networking message with a poignant remark, which is widely forwarded is selected as a representative social networking message for the user.

Continuing with the example, as users are connecting to the social network application, the story may be presented to a selection of the users. In particular in the example, a user who is assigned topics of national news and/or food may be presented with the poignant remark as the representative social networking message. Thus, the new user is able to see the new story and be exposed to the poignant remark.

Figure 7:
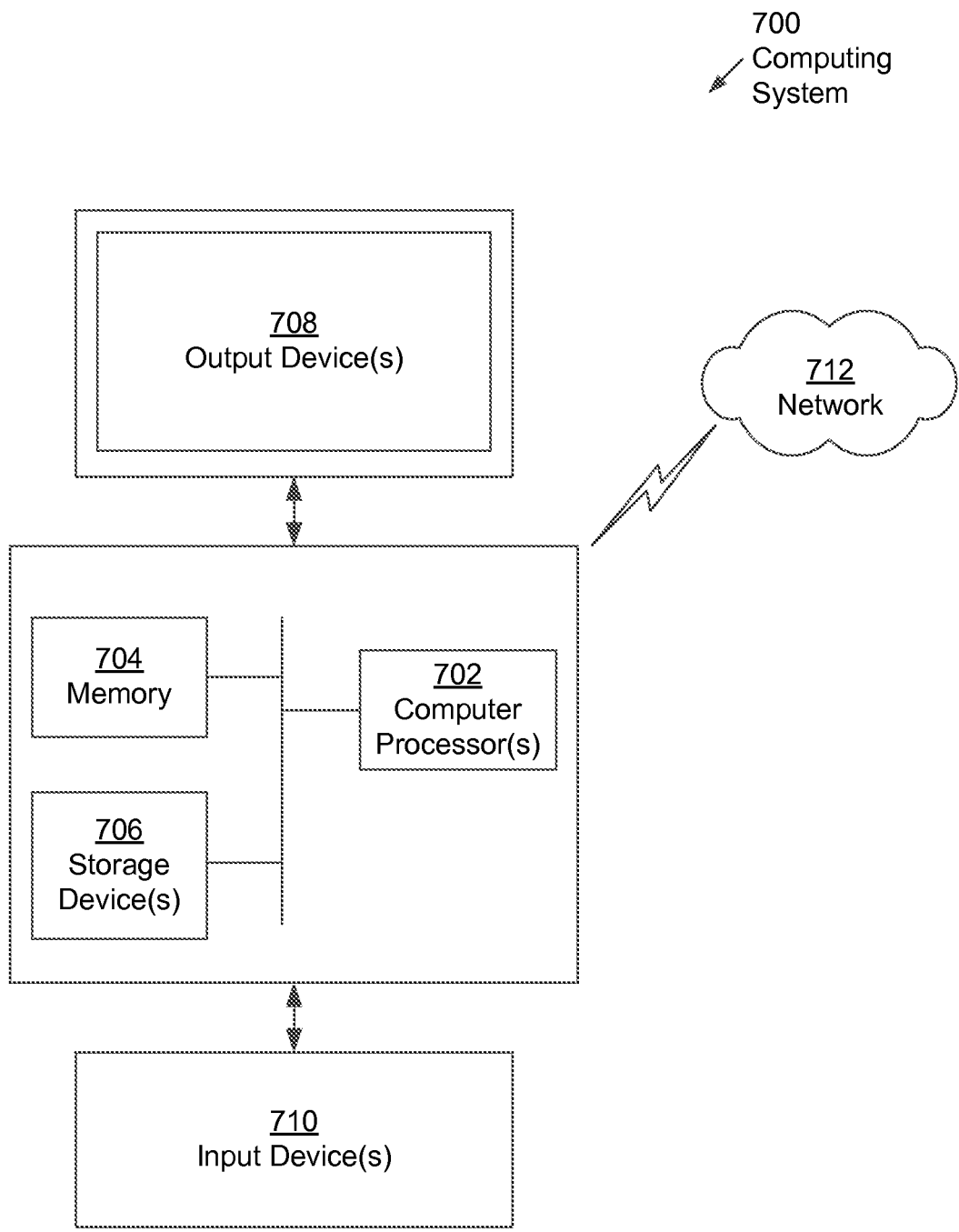
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for presenting information about a plurality of stories, comprising:
   processing documents about a plurality of stories to generate a plurality of clusters, wherein each cluster comprises at least one of the documents and corresponds to a respective one of the plurality of stories;
   for each cluster:
      obtaining, from a message repository storing social networking messages, a plurality of social networking messages about the story corresponding to the cluster, wherein each of the plurality of social networking messages comprises at least one keyword associated with at least one document in the cluster, generating, by a computer processor, a ranking of the plurality of social networking messages about the story corresponding to the cluster, and selecting, based on the ranking, one of the plurality of social networking messages as a representative social networking message for the story corresponding to the cluster;

selecting, by the computer processor, for a user, a subset of the plurality of clusters; and presenting, to the user, the representative social networking message about the story corresponding to each cluster in the subset of the plurality of clusters.

2. The method of claim 1, wherein generating the ranking comprises:

for each respective social networking message of the plurality of social networking messages,
calculating a weighted average of a plurality of scores for the respective social networking message; and
ordering the plurality of social networking messages according to the weighted average.

3. The method of claim 2, further comprising:

for each respective social networking message of the plurality of social networking messages,
calculating an aggregated user score for the respective social networking message,
wherein the plurality of scores comprises the aggregated user score.

4. The method of claim 2, further comprising:

for each respective social networking message of the plurality of social networking messages,
calculating a forwarding connection score based on connected forwards of the respective social networking message compared to disconnected forwards of the respective social networking message,
wherein the plurality of scores comprises the forwarding score.

5. The method of claim 2, further comprising:

for each respective social networking message of the plurality of social networking messages,
calculating a forwarding substance score based on a number of forwards about the content of the respective social networking message,
wherein the plurality of scores comprises the forwarding substance score.

6. The method of claim 2, further comprising:

for each respective social networking message of the plurality of social networking messages,
calculating a domain quality score defining a quality of a domain of a document of the documents in the cluster, wherein the respective social networking message comprises a reference to the document,
wherein the plurality of scores comprises the domain quality score.

7. The method of claim 1, wherein processing the documents comprises:

selecting a social network reference to a document, wherein the document is one of the documents;
obtaining an original reference matching the social network reference,
extracting content from the document referenced by the original reference,
identifying a story of the document based on the content, and
creating a new cluster when the story does not match an existing cluster of the plurality of clusters.

8. The method of claim 7, wherein extracting content from the document comprises:

identifying a plurality of keywords in the document,
wherein the story is identified from the plurality of keywords.

9. The method of claim 1, wherein selecting the subset of the plurality of clusters comprises:

selecting a plurality of topics based on the user,
matching the plurality of topics to the stories corresponding to the clusters, and
ranking the matched stories.

10. A system for presenting information about a plurality of stories comprising:

a computer processor; and
memory comprising:
a clustering engine configured to execute on the computer processor to enable the computer processor to:
process documents about a plurality of stories to generate a plurality of clusters, wherein each cluster comprises at least one of the documents and corresponds to a respective one of the plurality of stories,
a ranker configured to execute on the computer processor to enable the computer processor to:
for each cluster:
obtain, from a message repository storing social networking messages, a plurality of social networking messages about the story corresponding to the cluster, wherein each of the plurality of social networking messages comprises at least one keyword associated with at least one document in the cluster,
generate a ranking of the plurality of social networking messages about the story corresponding to the cluster, and
select one of the plurality of social networking messages as a representative social networking message for the story corresponding to the cluster according to the ranking,
and
a personalization engine, executing on the computer processor, configured to:
select, for a user, a subset of the plurality of clusters; and
present, to the user, the representative social networking message about the story corresponding to each cluster in the subset of the plurality of clusters.

11. The system of claim 10, further comprising:

a data repository comprising:
a story repository comprising the plurality of stories, and
a social network message repository comprising the plurality of social networking messages.

12. The system of claim 11, wherein the data repository further comprises:

a user data repository comprising a history and a plurality of preferences for the user,
wherein the user data repository is accessible by the personalization engine.

13. The system of claim 11, wherein the memory further comprises:

a reference tracker configured to execute on the computer processor to enable the computer processor to:
for each social network reference to a document, wherein the document is one of the documents:
obtain an original reference matching the social network reference, and store tracking information about selection of the social network reference.

14. The system of claim 13, wherein the memory further comprises:
a document content extractor configured to execute on the computer processor to enable the computer processor to:
extract content from the document referenced by the original reference, and
identify the story of the document based on the content.

15. The system of claim 14, wherein the clustering engine adds the document to an existing cluster of the plurality of clusters when the identified story matches the story corresponding to an existing cluster.

16. The system of claim 14, wherein extracting content from the document comprises:
identifying a plurality of keywords in the document,
wherein the story is identified based on the plurality of keywords.

17. The system of claim 11, wherein the clustering engine, the global ranker, and the personalization engine are comprised in a social network application.

18. A non-transitory computer readable medium comprising computer readable program code for:
processing documents about a plurality of stories to generate a plurality of clusters, wherein each cluster comprises at least one of the documents and corresponds to a respective one of the plurality of stories;
for each cluster:
obtaining, from a message repository storing social networking messages, a plurality of social networking messages about the story corresponding to the cluster, wherein each of the plurality of social networking messages comprises at least one keyword associated with at least one document in the cluster,
generating a ranking of the plurality of social networking messages about the story corresponding to the cluster, and
selecting one of the plurality of social networking messages as a representative social networking message for the story corresponding to the cluster according to the ranking;
selecting, for a user, a subset of the plurality of clusters; and
presenting, to the user, the representative social networking message about the story corresponding to each cluster in the subset of the plurality of clusters.

19. The non-transitory computer readable medium of claim 18, wherein generating the ranking comprises:
for each social networking message of the plurality of social networking messages,
calculating a weighted average of a plurality of scores for the social networking message; and
ordering the plurality of social networking messages according to the weighted average.

20. The non-transitory computer readable medium of claim 18, wherein selecting the subset of the plurality of clusters comprises:
selecting a plurality of topics based on the user,
matching the plurality of topics to the stories corresponding to each cluster, and
ranking the matched stories.

21. A computer implemented method for presenting social media messages corresponding to stories to a user, comprising:
processing documents referenced by social network messages to generate at least one cluster, wherein each cluster corresponds to a respective one of the stories and comprises at least one of the documents;
for each cluster:
obtaining, from a message repository storing social networking messages, social network messages about the story corresponding to the cluster;
determining scores for each of the social network messages about the story corresponding to the cluster;
based on the scores, selecting one of the social network messages as a representative social network message for the story corresponding to the cluster;
selecting one or more topics for the user based on user information;
comparing the selected topics to the stories corresponding to the clusters to identify one or more stories relating to the selected topics;
ranking the identified stories based on the respective scores for the representative social network messages for the identified stories; and
presenting to the user the representative social network message for each of one or more of the identified stories ordered according to the ranking.

22. The method of claim 21, wherein the score for each respective selected social network message is determined by calculating a forwarding connection score based on connected forwards of the respective social networking message compared to disconnected forwards of the respective social networking message.

23. The method of claim 21, wherein the score for each respective selected social network message is determined by calculating a forwarding substance score based on a number of forwards about the content of the social network message.

24. The method of claim 21, wherein the user information comprises information about connections of the user to other users.

25. The method of claim 21, wherein the user information comprises prior selections of social network messages by the user.

26. The method of claim 21, wherein the user information comprises content of prior social network messages of the user.

27. A social network system comprising:
one or more server computers configured to present social media messages corresponding to stories to a user, the server computers being configured to perform operations comprising:
processing documents referenced by social network messages to generate at least one cluster, wherein each cluster corresponds to a respective one of the stories and comprises at least one of the documents;
for each cluster:
obtaining, from a message repository storing social networking messages, social network messages about the story corresponding to the cluster;
determining scores for each of the social network messages about the story corresponding to the cluster;
based on the scores, selecting one of the social network messages as a representative social networking message for the story corresponding to the cluster;
selecting one or more topics for the user based on user information;
comparing the selected topics to the stories corresponding to the clusters to identify one or more stories relating to the selected topics;

ranking the identified stories based on the respective scores for the representative social network messages for the identified stories; and presenting to the user the representative social network messages for each of one or more of the identified stories ordered according to the ranking.

28. The system of claim 27, wherein the score for each respective selected social network message is determined by calculating a forwarding connection score based on connected forwards of the respective social networking message compared to disconnected forwards of the respective social networking message.

29. The system of claim 27, wherein the score for each respective selected social network message is determined by calculating a forwarding substance score based on a number of forwards about the content of the social network message.

30. The system of claim 27, wherein the user information comprises information about connections of the user to other users.

31. The system of claim 27, wherein the user information comprises prior selections of social network messages by the user.

32. The system of claim 27, wherein the user information comprises content of prior social network messages of the user.

* * * * *